United States Patent [19]

Watanabe et al.

[11] Patent Number: 5,714,242
[45] Date of Patent: Feb. 3, 1998

[54] CERAMIC MATERIAL AND METHOD FOR MANUFACTURING CERAMIC PRODUCT UTILIZING IT

[75] Inventors: Keiichiro Watanabe, Kasugai; Shigeki Kato; Koji Egawa, both of Nagoya, all of Japan

[73] Assignee: NGK Insulators, Ltd., Nagoya, Japan

[21] Appl. No.: 460,154

[22] Filed: Jun. 2, 1995

[30] Foreign Application Priority Data

Oct. 19, 1994 [JP] Japan ................... 6-253805
Mar. 28, 1995 [JP] Japan ................... 7-069399

[51] Int. Cl.$^6$ ................................. B32B 3/26
[52] U.S. Cl. ................... 428/304.4; 428/312.2; 428/312.8; 428/318.4; 428/319.7; 428/319.9
[58] Field of Search ............... 428/307.3, 312.2, 428/312.8, 304.4, 318.4, 319.7, 319.9

[56] References Cited

U.S. PATENT DOCUMENTS

| | | | |
|---|---|---|---|
| 4,579,705 | 4/1986 | Matsuoka et al. | 264/66 |
| 4,892,786 | 1/1990 | Newkirk | 428/307.3 |
| 5,116,663 | 5/1992 | Fujimoto | 428/209 |
| 5,238,593 | 8/1993 | Jones et al. | 252/88 |
| 5,258,205 | 11/1993 | Wu | 427/393.6 |

FOREIGN PATENT DOCUMENTS

| | | |
|---|---|---|
| 59-96912 A | 6/1984 | Japan. |
| 4-280855 A | 10/1992 | Japan. |
| 5-71533 B2 | 10/1993 | Japan. |

Primary Examiner—Timothy Speer
Attorney, Agent, or Firm—Kubovcik & Kubovcik

[57] ABSTRACT

A ceramic material is a calcined article obtained by calcining a molded ceramic article and in which the pores of the calcined article are impregnated with a substance which can be removed at a temperature lower than a sintering temperature for the molded ceramic article. A method for manufacturing a ceramic product includes the steps of calcining a molded ceramic article, impregnating the open pores of the calcined ceramic article with a substance which can be removed at a temperature lower than a sintering temperature for the calcined ceramic article, mechanically machining the ceramic article to impart a desired shape thereto, removing the substance from the ceramic article, and then sintering the ceramic article. Large-sized ceramic products having a high strength and an excellent shape accuracy and having complex shapes can be manufactured at low costs. The change of the product shape can be accomplished only by changing a program for operation, and for the ceramic products having various shapes, a prompt design changing is possible.

4 Claims, 2 Drawing Sheets

CERAMIC MATERIAL AND METHOD FOR MANUFACTURING CERAMIC PRODUCT UTILIZING IT

BACKGROUND OF THE INVENTION (i) Field of the Invention

The present invention relates to a ceramic material which can be suitably utilized to manufacture ceramic parts and products having a high machining efficiency and a high reliability, particularly many kinds and a small number of ceramic parts and products having complicated shapes at low costs, and a method for manufacturing the ceramic product utilizing this ceramic material.

(ii) Description of the Prior Art

Ceramic materials such as silicon nitride, silicon carbide and partially stabilized zirconia have excellent characteristics such as high heat resistance, high wear resistance, high hardness and high anticorrosion, and therefore they are now used as part of engine parts and mechanical parts. In addition, by virtue of successive improvement and the optimization of design, the utilization fields of the ceramic materials are being expanded.

In general, the ceramic materials shrink as much as ten and several percent at the time of sintering, and hence, when these ceramic materials are used for engine parts of cars and gas turbines in which a high dimensional accuracy is required, machining (grinding) is essential after the sintering.

Since ceramic sintered bodies are very hard, they are usually ground and machined by the use of a diamond grinder. However, the ceramics are so brittle that chipping and cracks tend to occur therein, and on the surfaces of products obtained by machining the ceramics, the cracks are liable to take place by thermal shock of grinding heat. Thus, various machining techniques have been suggested, but most of the specific contents regarding such techniques are concealed as know-how.

On the other hand, it is difficult to machine ceramic parts and products having complex shapes such as turbocharger charger rotors and turbine rotors, and for this reason, there is suitably used a manufacturing method which scarcely requires the machining before and after the sintering, for example, an injection molding method by which the parts and products can be substantially molded into a final shape.

Moreover, Japanese Patent Application Laid-Open No. 96912/1984 has disclosed a method which comprises calcining a press-molded article, mechanically machining it into a desired shape by a cutting tool secured with grinding particles, sintering it, and then carrying out finish machining.

In addition, there has also been reported the cutting properties of round bars made of $Al_2O_3$ and $Si_3N_4$ and the wear properties of ultra-hard alloy ceramic bites and diamond bites in the case that the round bars are extruded, calcined at various temperatures, and cut by the ultra-hard alloy ceramic bites under dry conditions and by the diamond bites under wet conditions.

Ceramic parts and products having complicated shapes such as the turbocharger rotors and the turbine rotors can be manufactured by an injection molding method, and in this case, the number of machining steps can be suitably decreased, but the cost of a mold for the injection molding is very high. Accordingly, the injection molding method is not suitable for the manufacture of many kinds and a small number of ceramic products.

In a method of cutting, in a dry state, a molded article which has been molded by press molding or extrusion or from which a binder has been removed by heating, bond strength between the particles of the molded article is so weak that the article tends to break, and on the cut surface of the molded article, the particles are stripped, so that the surface of the article is rough and the cracks are also liable to occur. Furthermore, when grinding is carried out by the use of a grinder, the resultant grind dust causes the clogging of the grinder, and therefore dressing is often required, which makes machining efficiency very bad. In addition, when wet machining is done, the molded article breaks, and therefore dry machining alone is utilizable. Consequently, the cooling effect is poor, so that machining velocity is low.

In a method described in Japanese Patent Application Laid-Open No. 96912/1984, a molded article is calcined at a calcination temperature of 1000° to 1500° C. for a period of 30 to 300 minutes to obtain hardness suitable for the dry mechanical machining, and it is also described therein that for example, in the case where silicon nitride is used, a calcination temperature of 1470° to 1490° C. is suitable. However, according to experiments for confirmation, the hardness of the calcined article was so high that satisfactory mechanical machining properties could not be obtained.

Furthermore, it has also been reported that in a method in which the molded article of silicon nitride is calcined at a temperature of 1000° C. or more and then cut under dry or wet conditions, a calcination temperature of 1400° C. is desirable for the good cutting properties of the article and a calcination temperature of 1300° C. is desirable for the smooth surface of the article. However, with regard to calcination conditions suitable for the manufacture of ceramic parts and products having the complicated shape such as the turbocharger rotors which can be obtained by the mechanical machining and sintering, nothing has been elucidated so far.

In view of such circumstances, the present applicant (assignee) has previously suggested a method for the wet mechanical machining of a calcined ceramic article having specific physical properties (Japanese Patent Publication (Kokoku) No.71533/1993 and Japanese Patent Application Laid-Open No. 280855/1992).

In these methods, the calcined ceramic article is excellent in machinability and shape impartment properties, but impurities contained in a grind liquid which can be used at the time of the wet mechanical machining and the grind dust get into and remain in the open pores of the calcined ceramic article. In consequence, the strength of a ceramic sintered body obtained by sintering deteriorates inconveniently.

SUMMARY OF THE INVENTION

Therefore, objects of the present invention are to provide a method to solve the problems described above and to provide a method for manufacturing a ceramic product having a high strength and an excellent shape accuracy and having complicated shapes at low costs.

According to the present invention, there can be provided a ceramic material which is a calcined article obtained by calcining a molded ceramic article and in which the pores of the calcined article are impregnated with a substance which can be removed at a temperature lower than a sintering temperature for the molded ceramic article.

Furthermore, according to the present invention, there can be provided a method for manufacturing a ceramic article which comprises the steps of calcining a molded ceramic article, impregnating the open pores of the calcined ceramic article with a substance which can be removed at a temperature lower than a sintering temperature for the calcined ceramic article, mechanically machining the ceramic article to impart a desired shape thereto, removing the substance from the ceramic article, and then sintering the ceramic article.

DETAILED DESCRIPTION OF THE INVENTION

Figure 1:
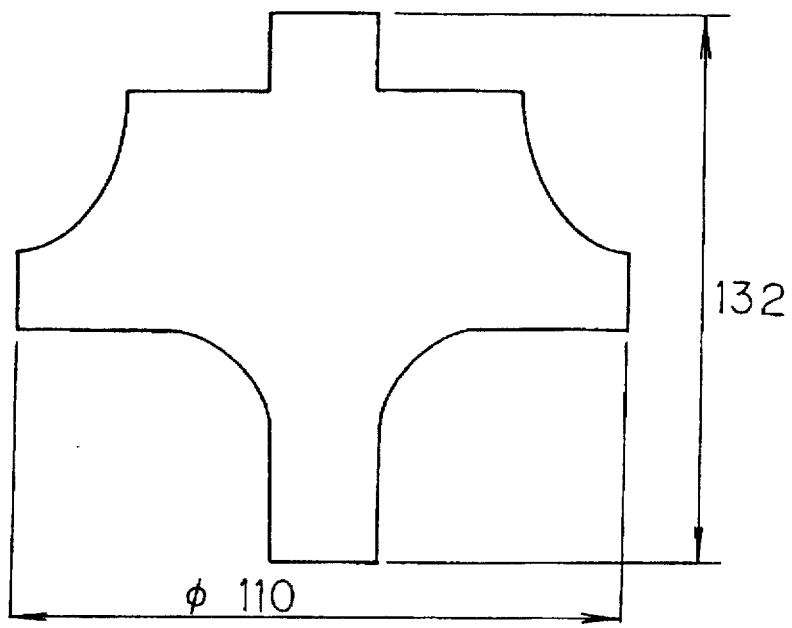
FIG. 1 is a sectional view of each crude turbine rotor product roughly machined in Examples 1 to 3.

Next, the present invention will be described in detail in accordance with the manufacturing steps of a ceramic product.

In the present invention, a ceramic material is used, but no particular restriction is put on the kind of ceramic material. Examples of the ceramic material include silicon nitride, silicon carbide, alumina, partially stabilized zirconia, mullite and cordierite.

The ceramic material is usually mixed with a sintering additive and/or a molding additive (a binder), and then molded into a predetermined shape. No particular restriction is put on the molding method, but suitably usable examples of the molding method include usual molding methods such as press molding, Cold Isostatic Pressing (CIP) molding, injection molding, casting and extrusion as well as combinations thereof.

If necessary, secondary molding is carried out before or after the binder has been removed from the molded article, which removal technique will be described hereinafter.

Molding pressure can be suitably selected so that the molded article having such a density as to permit sintering may be obtained. For example, molding pressure is preferably carried out under an isostatic pressure of 1 to tons/cm².

Next, the binder is usually removed from the molded article. A binder removal method should be selected in consideration of the ceramic material and the molding method which are used. Needless to say, in the case of the molding method in which no binder is used, the binder removal step is not necessary.

The typical binder removal methods are as follows.

(1) In the case that the ceramic material is silicon nitride and the molding method is press molding, when the material powder is obtained by spray drying, the powder is heated at a temperature of about 600° C. in the atmosphere to remove the binder contained in an amount of several percent in this powder.

(2) In the case that the ceramic material is silicon nitride and the molding method is injection molding, a usual de-waxing process is employed, whereby the binder is removed in the atmosphere or an inert gas.

(3) In the case that the ceramic material is silicon nitride and the molding method is extrusion, several percent of the binder which has been added at the time of kneading is removed by heating usually at a temperature of about 600° C. in the atmosphere.

(4) In the case that the ceramic material is cordierite and the molding method is extrusion, the binder removal is usually carried out simultaneously with the sintering. Therefore, in the present invention, it is preferable that the sintering step which is a subsequent step is done in this binder removal step at a temperature higher than a binder removal temperature.

Next, the calcination is carried out. No particular restriction is put on the calcination temperature, so long as it is such as not to lose the open pores of the molded ceramic article. Furthermore, no particular restriction is put on the calcination atmosphere, and it depends upon the kind of ceramic material. If the ceramic material is a non-oxidizing material, an inert gas should be selected, and if it is an oxidizing material, the atmosphere should be selected.

In calcining the molded ceramic article, it is preferable to control the shrinkage ratio. The total calcination shrinkage quantity is previously determined, and a shrinkage quantity by the calcination is then subtracted from the total shrinkage quantity. Thus, the resultant remainder is regarded as the shrinkage ratio. From the viewpoint of dimensional accuracy, the shrinkage ratio is preferably 5% or less, more preferably 2% or less.

The open pore diameter and the pore volume of the calcined ceramic article which can be obtained by the calcination depend upon the particle diameter of the ceramic powder, the molding pressure, the calcination temperature and the like. No particular restriction is put on the open pore diameter and the pore volume, but they are important factors which have an influence on the impregnation velocity of an impregnation substance and mechanical machinability. Therefore, the mean open pore diameter is preferably in the range of 0.01 to 0.2 μm, and the pore volume is preferably in the range of 0.1 to 0.3 cc/g (these values were measured by a mercury press-in type porosimeter).

The strength of the calcined ceramic article also depends upon the particle diameter of the ceramic powder, the molding pressure, the calcination temperature and the like, and this strength is also an important factor which has an influence of the mechanical machinability. Four-point bending strength (JIS R 1601), which is not particularly restricted, is preferably 10 MPa or more, whereby the breakage of the calcined ceramic article, the occurrence of cracks and the like can be prevented during the machining. If the four-point bending strength is less than 200 MPa, grinding resistance is low, so that the grinding efficiency can be preferably improved. Therefore, in view of these points, the four-point bending strength is preferably in the range of 10 to 200 MPa, more preferably 10 to 100 MPa.

Next, the calcined ceramic article is impregnated with a substance such as an organic material. The purpose of the impregnation is to prevent impurities contained in a grind liquid and grind dust from getting into the calcined ceramic article in the subsequent mechanical machining step. For this purpose, the surface pores and all the pores of the calcined ceramic article are impregnated with a predetermined substance (an impregnation substance) such as the organic material.

Any impregnation substance can be used, so long as it can be removed from the calcined ceramic article at a temperature lower than a sintering temperature for the calcined ceramic article. Accordingly, the organic material containing hydrogen and carbon as the main components which can be burned, decomposed or melted by heating is preferable, and hence examples of the preferable impregnation substance include waxes, resins, oils and glycerin.

In the case that a liquid such as an oil is used as the impregnation material, the calcined article, for example, can be dropped and immersed in the liquid to impregnate the same with the liquid. If necessary, the impregnation can be accelerated by reducing pressure. The calcined article may be thrown in the liquid and then impregnated therewith preferably under isostatic pressure to accelerate the impregnation. In this case, a gas or a liquid can be used as a pressure medium, but the gas pressure impregnation is preferable in consideration of cost. In the case that a solid such as the wax or the resin is used as the impregnation substance, the solid impregnation substance is first heated and melted into a liquid, and the impregnation is then carried out by the same procedure as mentioned above.

The impregnation thickness of the calcined article is such as to be thicker than the surface thickness of the calcined article which will be removed by the subsequent machining process. The amount of the impregnation substance with which the calcined article is impregnated can be suitably controlled by adjusting the immersion time of the calcined article in the impregnation substance and the reduction degree of the pressure.

After the impregnation of the calcined ceramic article with the organic substance or the like, the calcined ceramic article is mechanically machined into a predetermined shape. Examples of a mechanical machining device include a milling machine, a surface grinder, an internal grinder, a cylindrical grinder and a machining center, and in compliance with a desired shape to be formed, the suitable mechanical machining device can be selected therefrom. As a grinding tool such as a grind stone, GC, WA, diamond, an ultra-hard alloy or an end mill can be used, and the grinding tool can be suitably used in accordance with a desired product shape and the mechanical machining device. As a mechanical machining method, wet and dry mechanical machining methods can both be employed, and for example, the wet machining is suitable for products having a complicated three-dimensional shape such as turbine rotors and stator blades of turbines, and the dry machining is suitable for products such as simple cylinders and simple plates.

Since the calcined ceramic article impregnated with the predetermined substance can be mechanically machined, undercut parts which cannot be molded by conventional injection molding or casting can be advantageously manufactured.

After the calcined ceramic article has been mechanically machined, the impregnation substance contained in the calcined article is removed therefrom. As a removal method of the impregnation substance, any one of heating-combustion, heating-decomposition, melting-extraction, dissolving-extraction, super critical extraction and sublimation can be suitably employed in compliance with the kind of impregnation substance. The impregnation substance is required to be removed from the calcined article by carrying out an operation such as heating at a temperature lower than the sintering temperature of the ceramic article to bring about a phenomenon such as the combustion, the decomposition, the extraction or the sublimation of the impregnation substance.

As the removal method of the impregnation substance, any one of the above-mentioned techniques may be used, but in the case that an organic material is used as the impregnation substance, heating-combustion or heating-decomposition can be preferably applied, and in this case, the calcined ceramic article is heated up to about 600° C. in the atmosphere to remove the impregnation substance therefrom.

After the impregnation substance has been removed from the calcined ceramic article, sintering is carried out. In this case, sintering conditions are suitably decided in compliance with the kind of ceramic material. For example, in the case of silicon nitride, the sintering is preferably carried out at a temperature of 1600° to 2000° C. in a nitrogen gas atmosphere. Furthermore, in the case of silicon carbide, the sintering is preferably carried out at a temperature of 1900° to 2300° C. in an argon gas atmosphere. Additionally, in the case of partially stabilized zirconia, the sintering is preferably carried out at a temperature of 1300° to 1600° C. in air.

Next, the present invention will be described in detail on the basis of examples, but the scope of the present invention should not be limited to these examples.

EXAMPLE 1

As sintering additives, 5 parts by weight of yttrium oxide and 2 parts by weight of aluminum oxide were ground and mixed with 93 parts by weight of a silicon nitride powder having an average particle diameter of 0.5 µm, and as molding additives (binders), 1 part by weight of polyvinyl alcohol and 1 part by weight of polyethylene glycol were further added thereto. Afterward, granules were prepared from the resultant mixture BY a spray drying method.

The granules were filled into a rubber mold for molding, and press molding was then carried out under an isostatic pressure of 7 tons/cm$^2$. Next, the thus molded article was treated by an NC lathe to prepare a crude article of a turbine rotor having a diameter of 110 mm and a height of 132 mm shown in FIG. 1.

Next, the obtained crude article was heated up to 500° C. at a temperature rise rate of 25° C./hr in the atmosphere and then maintained at this temperature for 20 hours to release and remove the binder therefrom. At this time, neither cracks nor defects were observed.

Afterward, the crude article from which the binder had been removed was calcined at 1350° C. for 3 hours in a nitrogen gas atmosphere. Characteristics of the thus calcined article were inspected, and as a result it was apparent that the total pore volume was 0.19 cc/g, an average pore diameter was 0.03 µm, and the strength of the calcined article was 61 MPa.

The thus calcined article was impregnated with an impregnation substance. The calcined article was immersed in a cooking oil for 30 hours to impregnate the same up to its central portion.

Figure 2:
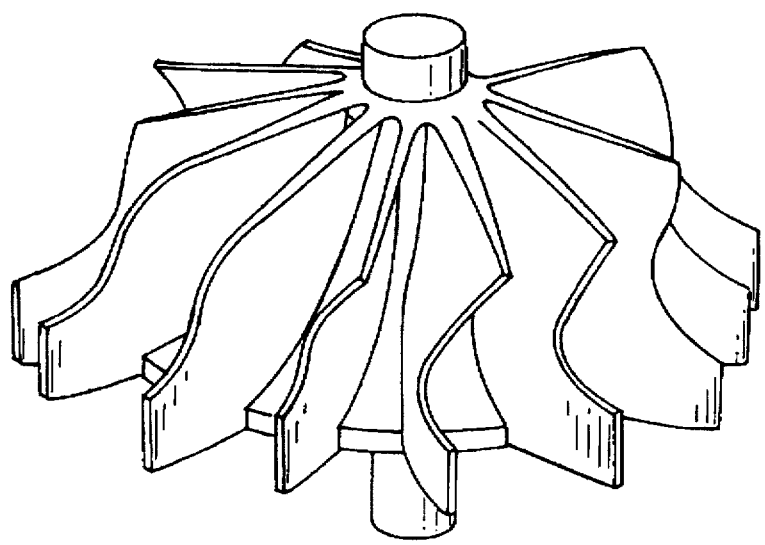
FIG. 2 is a perspective view of each calcined turbine rotor mechanically machined in Examples 1 to 3.

Next, the thus treated article was mechanically machined, i.e., ground in a wet state by the use of a five-axis machining center as a machining device, WS-500A made by Polar Chip Co., Ltd. as a grind liquid and a diamond grinder as a grinding tool to manufacture a large-sized turbine rotor shown in FIG. 2.

The calcined large-sized turbine rotor was heated up to 500° C. at a temperature rise rate of 50° C./hr in the atmosphere and then maintained at this temperature for 10 hours to remove the impregnation substance from the calcined article.

Next, the article was sintered at 1800° C. for 4 hours in a nitrogen gas atmosphere to obtain a sintered body of the turbine rotor. In the last place, the simple shape portions of the sintered body were finished by a cylindrical grinder to obtain a final product.

The characteristics of the obtained sintered product were measured. Furthermore, the shape accuracy of a blade section was measured and a cold spin test was made. The results are shown in Table 1.

COMPARATIVE EXAMPLE

All the same procedure as in Example 1 was repeated except that a calcined article was not impregnated with any substance, to obtain the final product of a turbine rotor. The characteristics of the obtained product were measured. Furthermore, the shape accuracy of a blade section was measured and a cold spin test was made. The results are shown in Table 1.

COMPARATIVE EXAMPLE 2

The same silicon nitride powder and sintering additives as in Example 1 were used, and 78 parts by weight of the mixed powder of these materials was kneaded with 22 parts by weight of a molding coagent (a binder) mainly comprising a wax. Afterward, the kneaded material was extruded, and then pelletized to prepare a molding material.

Next, this molding material was molded into an integral turbine rotor by injection molding, and surplus portions of an axial portion and the like were then machined to obtain the same turbine rotor article as in FIG. 1.

This turbine rotor article was dewaxed for 9 days under a nitrogen gas atmosphere, and carbon was then removed therefrom in the air. Afterward, the thus dewaxed article was observed, and as a result, it was confirmed that slight cracks were present in thick portions.

Next, this dewaxed article was covered with a latex rubber, and then subjected to secondary molding under an isostatic pressure of 7 tons/cm$^2$.

The thus secondarily molded article was sintered at 1800° C. for 4 hours under a nitrogen gas atmosphere as in Example 1 to obtain a sintered body of the turbine rotor. In the last place, the simple shape portions of the sintered body were finished by a cylindrical grinder to obtain a final product. The characteristics of the obtained sintered product were measured. Furthermore, the shape accuracy of a blade section was measured and a cold spin test was made. The results are shown in Table 1.

TABLE 1

|  | Example 1 | Comp. Example 1 | Comp. Example 2 |
|---|---|---|---|
| Characteristics of Sintered body |  |  |  |
| Density (g/cm$^3$) | 3.261 | 3.259 | 3.251 |
| Flexural Strength at Room Temperature (MPa) | 800 ± 60 | 750 ± 70 | 670 ± 100 |
| Flexural Strength at 1200° C. (MPa) | 710 ± 30 | 540 ± 20 | 630 ± 60 |
| Days for Manufacture | 15 days | 14 days | 22 days |
| Cost of Shape Impartment (yen) | Soft Price = 1,000,000 |  | Mold Price = 7,000,000 |
| Cost of machining (yen) | 1,000,000 |  | 0 |
| Dimensional Accuracy of Blade Portion | Profile Tolerance = 0.1 mm | Profile Tolerance = 0.1 mm | Profile Tolerance = 0.1 mm |
| Cold Spin Results | Burst at 180,000 rpm | Burst at 150,000 rpm | Burst at 130,000 rpm |

EVALUATION 1

As is apparent from the results of Example 1 and Comparative Examples 1 and 2, the product obtained according to the present invention in Example 1 has a higher strength and a more excellent shape accuracy as compared with the products obtained in Comparative Examples 1 and 2. In addition, it is definite that in Example 1 regarding the present invention, the large-sized turbine rotor can be manufactured at a low cost.

EXAMPLE 2

As in Example 1, a crude turbine rotor article was prepared, and binder removal and calcination were then carried out.

Next, the calcined article was impregnated with an impregnation substance. The calcined article was immersed in a cooking oil for 5 hours by the use of a gas as a pressure medium, i.e., under a gas isostatic pressure of 8 atm.

Afterward, the thus treated article was mechanically machined, i.e., ground in a wet state by the use of a five-axis machining center as a machining device, WS-500A made by Polar Chip Co., Ltd. as a grind liquid and an end mill as a grinding tool to manufacture a large-sized turbine rotor shown in FIG. 2.

The calcined large-sized turbine rotor was heated up to 500° C. at a temperature rise rate of 50° C./hr in the atmosphere and then maintained at this temperature for 10 hours to remove the impregnation substance from the calcined article.

Next, the article was sintered at 1800° C. for 4 hours in a nitrogen gas atmosphere to obtain a sintered body of the turbine rotor. In the last place, the simple shape portions of the sintered body were finished by a cylindrical grinder to obtain a final product.

The characteristics of the obtained sintered product were measured. Furthermore, the shape accuracy of a blade section was measured and a cold spin test was made. The results are shown in Table 2.

EXAMPLE 3

The same procedure as in Example 2 was repeated except that an article was impregnated with a cooking oil for 30 seconds under an isostatic pressure of 0.5 ton/cm$^2$ by the use of a liquid as a pressure medium, thereby forming a turbine rotor. The characteristics of its sintered product end the shape accuracy of a blade section were measured, and a cold spin test was made. The results are shown in Table 2. In removing a binder, neither cracks nor defects were observed.

TABLE 2

|  | Example 2 | Example 3 |
|---|---|---|
| Characteristics of Sintered body |  |  |
| Density (g/cm$^3$) | 3.262 | 3.260 |
| Flexural Strength at Room Temperature (MPa) | 800 ± 60 | 810 ± 70 |
| Flexural Strength at 1200° C. (MPa) | 740 ± 30 | 720 ± 20 |
| Dimensional Accuracy of Blade Portion | Profile Tolerance = 0.1 mm | Profile Tolerance = 0.1 mm |
| Results of Cold Spin | Burst at 180,000 rpm | Burst at 180,000 rpm |

EVALUATION 2

In Examples 2 and 3, the impregnation of each article with the impregnation substance is carried out under the hydrostatic pressure, whereby the sufficient impregnation can be achieved in a short period of time. As is apparent from the above-mentioned results, the large-sized turbine rotor having a higher strength and a more excellent shape accuracy can be manufactured.

EXAMPLE 4

As sintering additives, 5 parts by weight of yttrium oxide and 2 parts by weight of aluminum oxide were ground and mixed with 93 parts by weight of a silicon nitride powder having an average particle diameter of 0.5 μm, and as molding additives, 1 part by weight of polyvinly alcohol and 1 part by weight of polyethylene glycol were further added thereto. Afterward, granules were prepared from the mixture by a spray drying method.

Next, the prepared granules were filled into a rubber mold for molding in which a core bar was arranged, and then subjected to press molding under an isostatic pressure of 250 kg/cm². Afterward, the molded article was released from the mold, covered with a rubber, and then subjected to secondary molding under an isostatic pressure of 7 tons/cm².

Afterward, the molded article was roughly machined by a surface grinder so that the machining margin of the calcined article might be 2 mm.

The obtained crude article was heated up to 500° C. at a temperature rise rate of 50° C./hr in the atmosphere and then maintained at this temperature for 5 hours to release and remove the binder therefrom. At this time, neither cracks nor defects were observed.

Next, the crude article from which the binder had been removed was calcined at 1350° C. for 3 hours in a nitrogen gas atmosphere. Characteristics of the thus calcined article were inspected, and as a result it was apparent that the total pore volume was 0.19 cc/g, an average pore diameter was 0.03 μm, and the strength of the calcined article was 61 MPa.

The thus calcined article was impregnated with an impregnation substance. The calcined article was thrown into a wax molten at 130° C. and immersed for 5 hours under vacuum deaeration. The impregnation depth (thickness) of the calcined article with the wax was 2.5 mm from the surface of the article.

Figure 3:
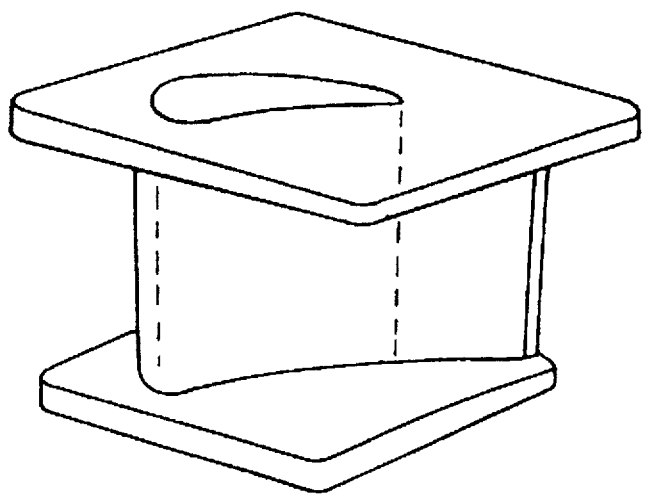
FIG. 3 is a perspective view of a calcined turbine nozzle mechanically machined in Example 4.

Next, the thus treated article was mechanically machined, i.e., ground in a wet state by the use of a five-axis machining center as a machining device, UB75 made by Usiro Science Co., Ltd. as a grind liquid and an end mill stone as a grinding tool to manufacture a 10 megawatt turbine nozzle shown in FIG. 3. After the mechanical machining, the weight of the calcined article was 230 g.

The calcined turbine nozzle was heated up to 500° C. at a temperature rise rate of 50° C./hr in the atmosphere and then maintained at this temperature for 5 hours to melt and remove the impregnation substance from the calcined article.

Next, the article was sintered at 1800° C. for 4 hours in a nitrogen gas atmosphere to obtain a sintered body of the turbine nozzle. In the last place, the portions of the sintered body in which a severe shape accuracy was required were finished by a wet surface grinder to obtain a final product. The characteristics of the obtained sintered product were measured. Furthermore, the shape accuracy of a blade section was measured. The results are shown in Table 3.

COMPARATIVE EXAMPLE 3

The same procedure as in Example 2 was repeated except that a calcined article was thrown into a wax molten at 130° C. and immersed for 5 hours and the impregnation depth (thickness) of the calcined article with the wax was 2.5 mm from the surface of the article, thereby obtaining the final product of a turbine nozzle. The characteristics of the obtained product and the shape accuracy of a blade section was measured. The results are shown in Table 3.

After mechanical machining, the weight of the calcined article was 271 g.

TABLE 3

|  | Example 4 | Comp. Example 3 |
| --- | --- | --- |
| Characteristics of Sintered body |  |  |
| Density (g/cm³) | 3.265 | 3.261 |
| Flexural Strength at Room Temperature (MPa) | 850 ± 60 | 770 ± 60 |

TABLE 3-continued

|  | Example 4 | Comp. Example 3 |
| --- | --- | --- |
| Flexural Strength at 1200° C. (MPa) | 740 ± 30 | 600 ± 10 |
| Dimensional Accuracy of Blade Portion | Profile Tolerance = 0.1 mm | Profile Tolerance = 0.1 mm |

EVALUATION 3

As is apparent from the results of Example 4 and Comparative Example 3, according to the present invention, the large-sized turbine nozzle having a high strength and an excellent shape accuracy can be manufactured, but it is definite that if the calcined article is mechanically machined, i.e., ground more deeply than the impregnation depth of the impregnated article, the strength of the final product deteriorates.

In the above-mentioned examples and comparative examples, the characteristics of the calcined article and the sintered body were measured as follows.

The total pore volume and the average pore diameter of the calcined article were measured by a mercury press-in type porosimeter.

The strength of the calcined article and the sintered body was four-point bending strength obtained by measuring a cut test piece in accordance with JIS R 1601.

Furthermore, the shape accuracy of the blade section was measured by a three-dimensional shape measuring instrument (made by Zeiss Co., Ltd.).

The cold spin test was accomplished by carrying out a destructive test by the use of a cold spin tester (made by Maruwa Denki Co., Ltd.).

As described above, according to the present invention, large-sized ceramic products and parts having a high strength and an excellent shape accuracy and having complicated shapes can be manufactured at low costs.

Furthermore, according to the present invention, shape impartment can be carried out without requiring a mold or the like, and therefore the change of the product shape can be accomplished only by changing a program for operation. Thus, for the ceramic products having various shapes, a prompt design change is possible, so that In addition, undercut parts which cannot be molded by a conventional injection molding or casting can be advantageously manufactured.

What is claimed is:

1. A ceramic material which is a calcined article obtained by calcining a molded ceramic article, the calcined article having pores having a mean open pore diameter in a range of 0.01 μm to 0.2 μm, said pores being impregnated with a substance which can be removed at a temperature lower than a sintering temperature for the calcined article.

2. The ceramic material according to claim 1 wherein the substance which can be removed at a temperature lower than a sintering temperature for the calcined ceramic article is an organic material.

3. The ceramic material according to claim 1 wherein the impregnation of the substance which can be removed at a temperature lower that a sintering temperature for the calcined ceramic article is carried out under an isostatic pressure.

4. The ceramic material according to claim 1 wherein the calcined article is subjected to wet mechanical machining.

* * * * *